United States Patent [19]

Kasner et al.

[11] Patent Number: 4,885,448

[45] Date of Patent: Dec. 5, 1989

[54] PROCESS FOR DEFINING AN ARRAY OF PIXELS IN A THIN FILM ELECTROLUMINESCENT EDGE EMITTER STRUCTURE

[75] Inventors: William H. Kasner, Penn Hills; Zoltan K. Kun, Churchill Borough; David Leksell, Oakmont; Vincent A. Toth, Penn Township, Westmoreland County, all of Pa.

[73] Assignee: Westinghouse Electric Corp., Pittsburgh, Pa.

[21] Appl. No.: 254,282

[22] Filed: Oct. 6, 1988

[51] Int. Cl.[4] .............................................. B23K 26/00

[52] U.S. Cl. .............................................. 219/121.69

[58] Field of Search ..................... 219/121.68, 121.69; 250/227

[56] References Cited

U.S. PATENT DOCUMENTS 4,535,341 8/1985 Kun et al. ..................... 346/107 R 4,558,255 12/1985 Genovese et al. ................. 250/227

*Primary Examiner*—C. L. Albritton

*Attorney, Agent, or Firm*—Joseph C. Spadacene

[57] ABSTRACT

A method for defining an array of light-emitting pixels in a thin film electroluminescent edge emitter structure includes the steps of moving the structure in proximity to a stationary first laser source as the first laser source is operated to generate a plurality of first laser pulses. The plurality of first laser pulses are focused into "lines" of light energy that strike the structure at a plurality of spaced apart locations in succession to ablate a predetermined number of layers of the structure. This ablation process forms a plurality of spaced apart channels in the structure. The portions of the structure remaining between each pair of adjacent channels define an array of pixels in the structure. The structure having the pixels formed therein is moved in proximity to a second laser source. The second laser source is movable in a selected direction substantially perpendicular to the direction of movement of the structure. The second laser source provides a second laser beam that is focused to a "point" of light energy which strikes the end portion of each pixel at an area inward of the pixel edge surface to ablate a predetermined number of layers at each pixel end portion. The movement of the second laser beam is controlled relative to the movement of the structure to correspondingly control the amount of material ablated inward of the edge surface of each pixel to remove the pixel edge surface and form a new pixel edge surface shaped to a preselected contour.

20 Claims, 2 Drawing Sheets

FIG. 1
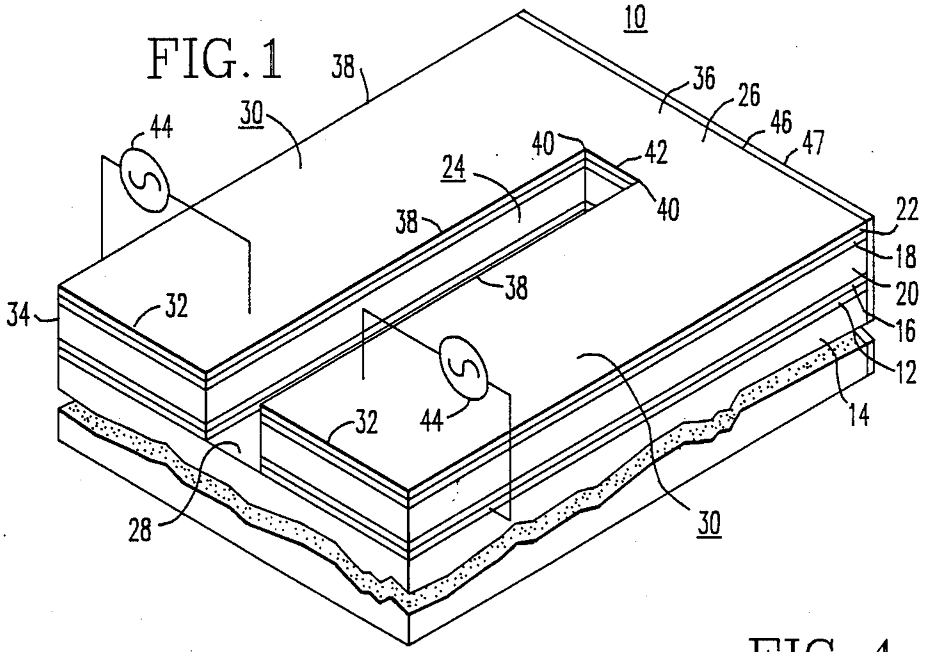
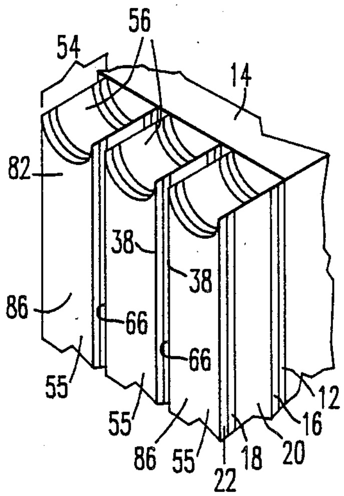
FIG. 3
FIG. 4
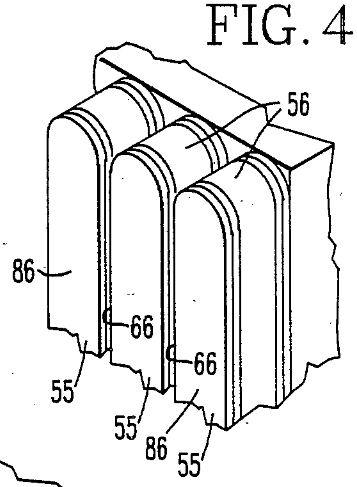
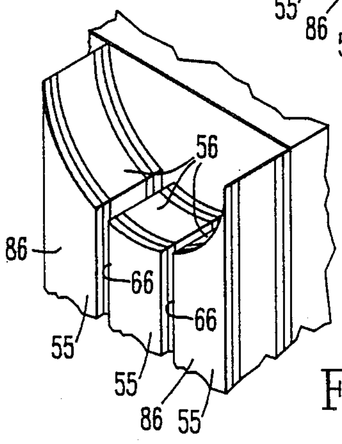
FIG. 5

PROCESS FOR DEFINING AN ARRAY OF PIXELS IN A THIN FILM ELECTROLUMINESCENT EDGE EMITTER STRUCTURE

BACKGROUND OF THE INVENTION

1. Field of the Invention

This invention relates generally to a process for defining an array of pixels in a thin film electroluminescent edge emitter structure, and more particularly, to a thin film electroluminescent edge emitter structure having an array of discrete light-emitting pixels defined therein via a laser scribing process.

2. Background Information

Thin film electroluminescent edge emitter structures having an array of individually addressable light-emitting pixels defined or formed therein are well known. One such structure is disclosed in U.S. Pat. No. 4,535,341 to Kun et al. which is assigned to the assignee of the present invention. This patent discloses a thin film electroluminescent line array structure which includes a common electrode disposed on a substrate, a first dielectric layer disposed on the common electrode, a second dielectric layer spaced from the first dielectric layer with a phosphor layer interposed therebetween and an excitation electrode disposed on the second dielectric layer. The excitation electrode may be delineated into a plurality of individual electrodes, and the plurality of individual electrodes, in combination with the remaining components of the structure, define the plurality of pixels of the line array. The delineation technique disclosed in Kun et al. for forming the individual electrodes is an ion milling technique, which includes ion milling the excitation electrode material after its deposition on the second dielectric layer. Other known techniques, such as wet or dry etching, may also be utilized to form the plurality of individual electrodes in the excitation electrode with similar results.

Although the ion milling technique disclosed in Kun et al. may be utilized to delineate the excitation electrode at a plurality of locations and thereby form the plurality of individual electrodes, this technique is basically an etching technique which requires the excitation electrode to be appropriately masked with a photomasking material prior to the actual milling phase. The portion of the excitation electrode remaining after ion milling defines the plurality of individual electrodes. It is apparent that placing a masking material on the excitation electrode prior to milling increases the overall number of process steps in the light-emitting pixel forming process and increases the number of pieces of equipment required to form the pixel array. Techniques such as wet etching, although also effective as a means for delineating the excitation electrode, require the use of hazardous chemicals and therefore present obvious safety hazards.

Therefore, there is a need for an improved process for defining an array of individual light-emitting pixels in a thin film electroluminescent edge emitter structure which is relatively simple to implement, time efficient and cost-effective for implementation in a high volume, commercial manufacturing environment.

SUMMARY OF THE INVENTION

In accordance with the present invention, there is provided a method for defining an array of pixels in a thin film electroluminescent edge emitter structure which includes providing a thin film electroluminescent edge emitter structure having a pair of outer, electrically conductive layers with a plurality of inner layers interposed therebetween, one of the inner layers being formed from a phosphor material. The structure and a first high energy source are moved relative to each other as the first high energy source is operated to project, in serial fashion, a plurality of first high energy pulses or beams. The plurality of first high energy beams strike one of the outer layers of the structure at spaced apart locations in succession. Each first high energy pulse or beam ablates the one outer layer and a predetermined number of inner layers of the structure at a single location to form a channel in the structure, the plurality of first high energy pulses or beams forming a plurality of channels in the structure. The portions of the structure remaining after formation of the plurality of channels define a plurality of pixels each having a pair of lateral edge surfaces and an end portion with an edge surface that terminates at an edge surface of the structure.

The structure having the plurality of pixels formed therein and a second high energy source are moved relative to each other as the second high energy source is operated to project a second high energy beam. The second high energy beam strikes each pixel end portion in succession at an area inward of the pixel edge surface to ablate the one outer layer and the predetermined number of inner layers at the end portion. The movement of the structure and at least the second high energy pulses relative to each other is controlled to correspondingly control the amount or material ablated from the one outer layer and the predetermined number of inner layers at the area inward of the pixel edge surface to remove the pixel edge surface and form a new pixel edge surface shaped to a preselected contour.

Further in accordance with the present invention, there is provided a method for defining an array of pixels in a thin film electroluminescent edge emitter structure which includes providing a thin film electroluminescent edge emitter structure formed from a first electrically conductive layer disposed on a substrate, a first dielectric layer disposed on the first electrically conductive layer, a second dielectric layer spaced from the first dielectric layer, a phosphor layer interposed between the first and second dielectric layers and a second electrically conductive layer disposed on the second dielectric layer. The layered structure is moved in proximity to a stationary first laser source with the second electrically conductive layer adjacent thereto. The first laser source is operated to project, in serial fashion, a plurality of first laser pulses or beams. The plurality of first laser beams strike the second electrically conductive layer at a plurality of spaced apart locations in succession. Each laser pulse or beam ablates a predetermined number of layers of the structure at a single location to form a channel in the structure, the plurality of first laser pulses or beams forming a plurality of channels in the structure. The portions of the structure remaining after formation of the plurality of channels define a plurality of pixels each having a pair of lateral edge surfaces and an end portion with an edge surface terminating at an edge surface of the structure.

The structure having the plurality of pixels formed therein is moved in proximity to a second laser source operable to project a second laser beam, at least the second laser beam being movable in a direction substantially perpendicular to the direction of movement of the structure. The projected second laser beam strikes each pixel end portion in succession at an area inward of the pixel edge surface to ablate the predetermined number of layers at the end portion. The movement of the structure and at least the second laser beam are controlled relative to each other to correspondingly control the amount of material ablated from the predetermined number of layers at the area inward of the pixel edge surface to remove the pixel edge surface and form a new pixel edge surface shaped to a preselected contour.

BRIEF DESCRIPTION OF THE DRAWINGS

The above as well as other features and advantages of the present invention will become apparent through consideration of the detailed description in connection with the accompanying drawings in which:

FIG. 1 is a perspective view of a thin film electroluminescent edge emitter structure having a channel formed therein to define a pair of individual light-emitting pixels;

FIG. 3 illustrates, in perspective, portions of three pixels positioned in side-by-side relationship, each pixel having an edge surface shaped to a convex contour viewed from the pixel body;

FIG. 4 illustrates, in perspective, portions of three pixels positioned in side-by-side relationship, each pixel having an edge surface shaped to a concave contour viewed from the pixel body; and FIG. 5 illustrates, in perspective, portions of three pixels positioned in side-by-side relationship and having their respective end portions contoured so that light generated by one of the pixels is projected into overlapping relationship with the light generated by the other two pixels.

DESCRIPTION OF THE PREFERRED EMBODIMENTS

Figure 2:
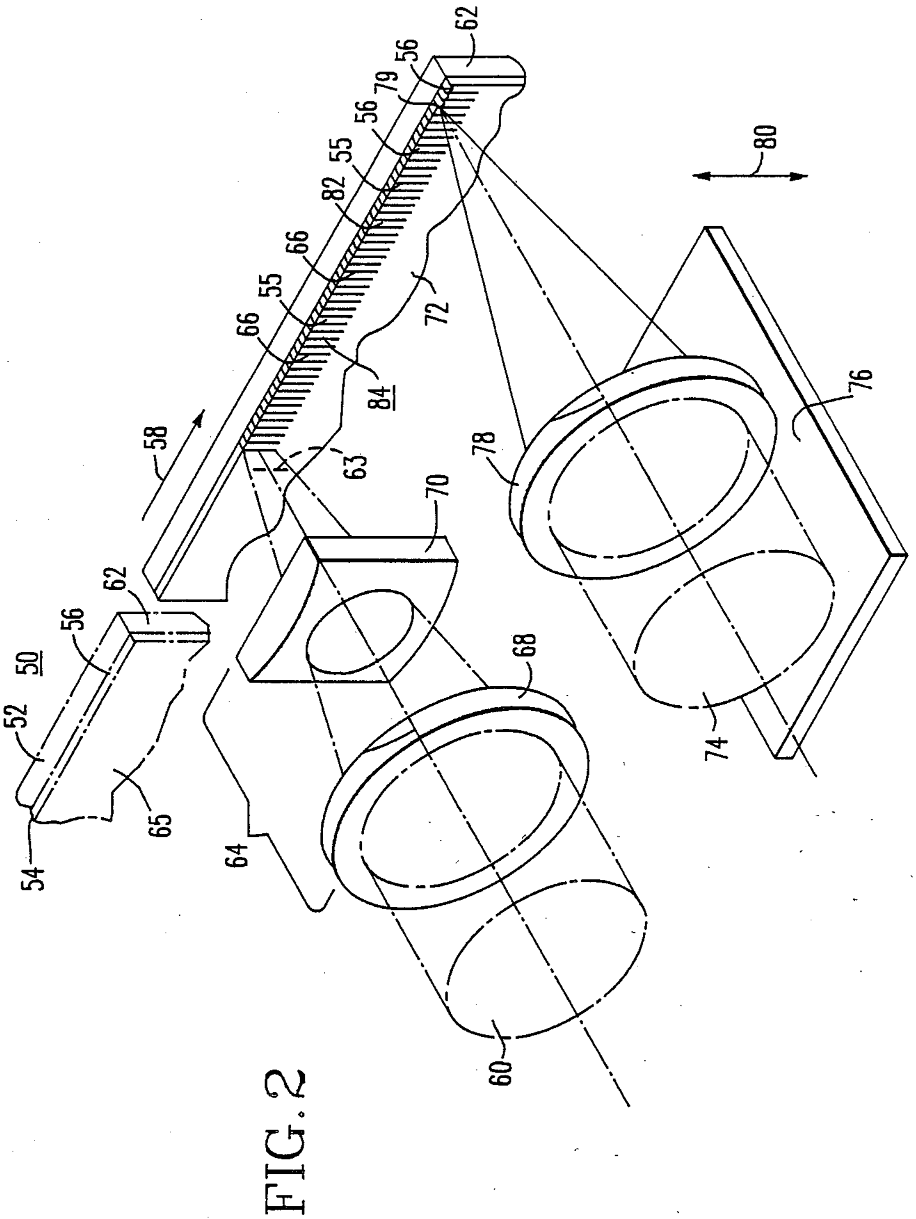
FIG. 2 is a perspective view of a thin film electroluminescent edge emitter structure as the structure is passed in proximity to the first and second laser sources in succession; and illustrating the operation of the first and second laser sources to define an array of light-emitting pixels in the structure.

Referring to the drawings, and particularly to FIG. 1, there is illustrated a thin film electroluminescent edge emitter structure generally designated by the numeral 10 which is utilized as a solid state, electronically controlled high resolution light source. Thin film electroluminescent (TFEL) edge emitter structure 10 includes a first layer of electrically conductive material 12 disposed on a substrate 14. A first layer of dielectric material 16 is disposed on first electrically conductive layer 12. A second layer of dielectric material 18 is spaced from first dielectric layer 16, and a phosphor layer 20 is interposed between the first and second dielectric layers. A second layer of electrically conductive material 22 is disposed on the second layer of dielectric material 18. It should be understood that although TFEL edge emitter structure 10 illustrated in FIG. 1 includes a first dielectric layer 16 disposed on first electrically conductive layer 12, first dielectric layer 16 may be eliminated from the structure if desired. If first dielectric layer 16 is not included in the structure, it is apparent that phosphor layer 20 will be interposed between first electrically conductive layer 12 and second dielectric layer 18. In addition, it should be understood that although first dielectric layer 16, if included in the structure, and second dielectric layer 18 are illustrated in the figures as unitary layers, each dielectric layer may in fact consist of a plurality of sublayers. The sublayers may be formed from different dielectric materials, and those skilled in the art may select the sublayer material utilized depending upon the dielectric properties desired.

As seen in FIG. 1, a generally rectangular channel 24 is formed in structure 10 and extends from the outer surface 26 of second electrically conductive layer 22 through the various layers 22, 18, 20, 16 and 12 to the surface 28 of substrate layer 14. The generally rectangular channel 24 formed in TFEL structure 10 defines a pair of discrete light-emitting pixels 30 each having an edge surface 32 terminating at the edge surface 34 of the TFEL structure. Since rectangular channel 24 extends a preselected distance into the central portion 36 of TFEL edge emitter structure 10 from edge surface 34, it is seen that the lateral edge surfaces of the channel form one of the lateral edge surfaces 38 of each pixel illustrated. The facing lateral edge surfaces 38 of the adjacent pixels 30 are connected at their respective end portions 40 by a connecting face 42.

As described, the rectangular channel 24 formed in TFEL edge emitter structure 10 defines a pair of adjacent light-emitting pixels 30 each having an edge surface 32 which extends between a pair of spaced apart lateral edge surfaces 38. The edge surface 32 of each pixel 30 has a generally planar contour, and, as will be explained later in greater detail, is the light-emitting face through which light generated within the pixel phosphor layer is projected into the medium adjacent to the pixel light-emitting face. It should be understood that although only a pair of light-emitting pixels 30 are illustrated in FIG. 1, the number of pixels formed in edge emitter structure 10 may be increased by increasing the number of channels 24 formed in the structure.

As further seen in FIG. 1, an excitation source 44 is in electrical communication with the first and second electrically conductive layers 12, 22 of each pixel 30. Each source 44 is operable to provide an appropriate signal for exciting the electroluminescent phosphor layer 20 of the pixel to which it is connected. The application of an appropriate excitation signal across the first and second electrically conductive layers of a particular pixel will cause the phosphor layer of the pixel to radiate light energy which is projected through the pixel edge surface or light-emitting face 32. The rear edge surface 46 of TFEL structure 10, that is, the edge surface opposite the pair of light-emitting faces 32, is mirrored with a suitable non-conductive reflector 47.

From the above, it can be appreciated that forming a plurality of channels in TFEL edge emitter structure 10 to define an array of light-emitting pixels such as the pixels 30 is an essential step in a pixelformed structure fabrication process. Forming a plurality of channels in the structure fully defines the plurality of pixels in the array. Each channel serves to optically isolate adjacent pixels from one another to prevent optical cross-talk.

In accordance with the present invention, there is provided a method for forming or defining an array of pixels in a TFEL edge emitter structure such as the pair of pixels 30 illustrated in FIG. 1 which utilizes laser scribing techniques and overcomes the deficiencies of the prior art delineating techniques. Since a laser system may be utilized to rapidly scribe, in a TFEL edge emitter structure, a plurality of spaced apart channels to thereby define an array of pixels, laser scribing is particularly useful in a high volume production line process where it is desired to produce a great number of pixel-formed structures in as short a time period as possible.

The laser scribing process for defining an array of pixels in a thin film electroluminescent edge emitter structure may best be understood by referring to FIG. 2. As seen in FIG. 2, there is illustrated in phantom a portion of a thin film electroluminescent edge emitter structure 50 which includes a substrate layer 52 with a laminar assembly 54 disposed thereon. Laminar assembly 54 represents the first and second electrically conductive layers 12, 22, first and second dielectric layers 16, 18 and the phosphor layer 20 of TFEL edge emitter structure 10 illustrated in FIG. 1. Stated in another manner, the TFEL edge emitter structure 50 which includes a substrate layer 52 with a laminar assembly 54 disposed thereon illustrated in phantom in FIG. 2 and the TFEL edge emitter structure 10 illustrated in FIG. 1 are identical with the exception that TFEL edge emitter structure 50, and particularly the laminar assembly 54, has not been subjected to the laser scribing process of the present invention to define an array of pixels along the planar edge surface 56 of the structure.

In order to define an array of light-emitting pixels in TFEL edge emitter structure 50 and obtain a pixel-formed structure, structure 50 is moved from a rest or starting position illustrated in phantom by suitable means in a direction indicated by the arrow 58 so that the laminar structure 54 is passed in proximity to a first high energy or laser source (not shown). The first laser source is operated to project, in serial fashion, a plurality of first high energy/laser pulses or beams 60 (one shown). As the leading edge 62 of structure 50 is translated at a substantially constant linear speed past the first laser source, the first laser source is operated to project the plurality of first laser pulses 60 in succession. Each of the first laser pulses is passed through a first focusing station 64 interposed between the first laser source and outer layer 65 of assembly 54. It should be apparent that outer layer 65 corresponds to the second electrically conductive layer 22 of TFEL edge emitter structure 10 illustrated in FIG. 1. Each first laser pulse 60 passed through first focusing station 64 is focused into a "line" of light energy schematically represented at 63 which strikes the outer layer 65 of laminar assembly 54 at a predetermined location dependent upon the rate of linear movement of structure 50 and the pulse rate of the first laser source. The "line" of light energy ablates a predetermined number of layers of assembly 54 depending upon the intensity of the pulse to form a generally rectangular channel 66 in the assembly 54 at the predetermined location. Thus, the plurality of "lines" of light energy produced as the plurality of first laser pulses are passed through first focusing station 64 in succession form a plurality of generally rectangular channels 66 in assembly 54.

Stated in another manner, as structure 50 is translated at a substantially constant speed in the direction indicated by the arrow 58, the first laser source is pulsed to project a plurality of individual first laser pulses 60, and each pulse is passed in succession through first focusing station 64.

First focusing station 64 includes a spherical lens 68 and a cylindrical lens 70 operable in combination to focus each first laser pulse into a "line" of light energy 63 which strikes the outer surface 65 of laminar assembly 54 and ablates a predetermined number of layers of the assembly to form the plurality of generally rectangular channels 66. The positioning of each generally rectangular channel may be controlled by controlling the speed at which structure 50 is translated past the stationary first laser source. For example, if the first laser source is pulsed at a rate of 50 Hz and it is desired to space the plurality of generally rectangular channels 0.001 inch apart, then structure 50 should ʰe translated or moved linearly at a speed of three inches per minute in the direction indicated by the arrow 58. At the above-stated pulse rate and structure speed, a 12 inch long structure 50 would require a process time of approximately 4 minutes to form the plurality of channels spaced at 0.001 inch.

As previously described, the laminar assembly 54 disposed on substrate layer 52 represents the first and second electrically conductive layers 12, 22, first and second dielectric layers 16, 18 and the phosphor layer 20 illustrated in FIG. 1. Therefore, with the structure 50 positioned as shown in FIG. 2 relative to the first laser source and first focusing station 64, each first laser pulse focused into a "line" of light energy 63 by first focusing station 64 will initially strike the second electrically conductive layer in laminar assembly 54. The number of individual layers in laminar assembly 54 ablated by each "line" of light energy is dependent upon the intensity of the projected light energy. It is preferred that each "line" of light energy be of sufficient intensity to ablate at least the second layer of electrically conductive material, the second layer of dielectric material and the phosphor layer at each location. After the plurality of "lines" of light energy strike laminar assembly 54 and form the plurality of spaced-apart channels, the portions of the laminar assembly remaining between each pair of adjacent channels define a plurality of pixels 55. The plurality of pixels is also referred to as an array. Since each channel extends into the laminar assembly at least through the phosphor layer, adjacent pixels are effectively optically isolated from each other and cross-talk between adjacent pixels is prevented.

Although what has been described herein is a method for forming a plurality of spaced-apart channels in a TFEL edge emitter structure which includes moving the structure at a substantially constant speed in proximity to a stationary first laser source, it should be understood that the process described herein may also be implemented by fixing the position of the structure and moving the first laser source and first focusing station relative thereto.

After TFEL edge emitter structure 50 is passed in proximity to the first laser source (not shown) and first focusing station 64 to define an array of pixels 55 each extending a preselected distance into the central portion 72 of the structure from edge surface 56, structure 50 is passed in proximity to a second high energy or laser source (not shown) operable to generate a second high energy or laser beam 74. As the structure 50, and particularly the plurality of pixels 55 in laminar assembly 54, is passed in proximity to the second laser source, second laser beam 74 is passed through a second focusing station 76. Second focusing station 76 includes a spherical lens 78 operable to focus second laser beam 74 into a "point" of light energy 79 which initially strikes the surface of laminar structure 54 at outer layer 65. As structure 50 is translated at a substantially constant linear speed in the direction indicated by the arrow 58, the second laser source and second focusing station 76 are moved in a selected direction substantially perpendicular to the direction of movement of structure 50 (indicated by the double arrow 80) to control the location at which the focused "point" of light energy 79 strikes outer layer 65 of laminar assembly 54. Controlling the movement of the second laser source and second focusing station 76 in a selected direction 80 substantially perpendicular to the direction of movement of structure 50 controls the amount of material ablated from the various layers of laminar assembly 54 at an area 82 inward from the planar edge surface 56 of each pixel 55 end portion 84 to shape each pixel end portion to a preselected contour. The planar edge surface 56 is thus effectively removed from the end portion 84 of each pixel 55 via the laser ablation process and a new edge surface (also referred to herein as 56) is formed having a desired contour. The new edge surface forms the light-emitting face of the pixel. Stated in another manner, as structure 50 is moved at a substantially constant linear speed in the direction indicated by the arrow 58, second laser source and second focusing station 76 are moved in a selected direction 80 substantially perpendicular to the direction of movement of structure 50 as the focused "point" of light energy 79 ablates a predetermined number of layers of material in laminar assembly 54 at each pixel end portion 84 to shape the edge surface of each pixel to a desired contour. Preferably, the "point" of light energy 79 ablates the same number of layers of material as the "line" of light energy 63.

Although the process described herein includes moving both the second laser source and second focusing station in a preselected direction perpendicular to the direction of movement of structure 50, it should be understood that, if desired, the second laser source may remain stationary during the pixel end portion-shaping process. It is apparent that the second laser source may remain stationary and the second laser beam directed toward the end portion of each pixel via a prism-like reflector between the second laser source and second focusing station; or by tilting the second focusing station relative to the second laser source to align the second laser beam perpendicular to the end portion of each pixel.

As described, the preferred method for defining an array of pixels 55 in a thin film electroluminescent edge emitter structure such as TFEL edge emitter structure 50 includes the step of first passing the structure in proximity to a first laser source operable to successively project a plurality of first laser pulses 60. Each of the first laser pulses 60 is focused into a "line" of light energy 63 which strikes the outer layer 65 of laminar assembly 54 and ablates a predetermined number of layers forming the assembly to form a channel therein. The plurality of first laser pulses 60 projected by the first laser source form a plurality of generally parallel channels 66 in the assembly which are spaced apart by a preselected distance dependent upon the speed at which structure 50 is translated and the pulse rate of the first laser source. The portions of laminar assembly 54 remaining between each pair of adjacent channels define the array of pixels in the structure.

After the array of pixels are defined, the structure is then passed in proximity to a second laser source operable to generate a second laser beam 74. The second laser beam is passed through a second focusing station 76, is focused into a "point" of light energy 79 and projected into striking relationship with the outer layer 65 of assembly 54. Movement of the second laser source and second focusing station in a selected direction substantially perpendicular to the direction of movement of structure 50 as the "point" of light energy ablates a predetermined number of layers at an area inward from the planar edge surface 56 of each pixel end portion 84 removes the planar edge surface and forms a new edge surfacing having a preselected or desired contour.

As previously described, the first and second laser sources should generate first and second laser beams, respectively, whose intensities are appropriately adjusted to provide that each of the laser beams ablates the same predetermined number of material layers in the laminar assembly. In addition, the first and second laser beams should be oriented substantially perpendicular to the adjacent outer layer of the TFEL edge emitter structure to provide that the lateral edge surfaces of each pixel defined as a pair of adjacent channels are formed in the laminar assembly are substantially perpendicular to the various layers ablated in the laminar assembly; and further provide that the contoured edge surface of each pixel lies in a plane which is also substantially perpendicular to the ablated layers.

Although the plurality of channels formed in TFEL edge emitter structure 50 have been described herein as generally rectangular channels positioned substantially parallel to each other, it should be understood that the configuration of each channel and the positioning of adjacent channels relative to each other may be varied depending upon the desired overall shape of each pixel defined in the array. For example, it may be desired to form each pixel so that the lateral side edges of the pixel converge at the pixel end portion, or it may be desired to form each pixel so that the pixel lateral side edges diverge at the end portion. either of these pixel shapes may be provided by adjusting the cross-sectional shape of each first laser pulse or beam striking the outer surface 65 of laminar assembly 54. From the preceding discussion, it should be apparent that the cross-sectional shape of each pixel in the array may be controlled by controlling the cross-sectional shape of each first laser pulse striking the outer surface of the structure.

From the above, it will also be appreciated that one of the benefits derived from defining the array of pixels in the structure via a laser scribing process is that the heat generated as each first and second laser beam ablates a predetermined number of layers causes a glazing or slight melting of the lateral edge surfaces and contoured edge surface of each pixel. This slight melting of the lateral edge surfaces and contoured edge surface of each pixel acts to seal each pixel and provides in situ packaging of the light-emitting pixel array.

Now referring to FIGS. 3–5, there are illustrated enlarged views of examples of the types of contoured light-emitting faces which may be formed at the end portion of each pixel utilizing the laser scribing method of the present invention.

In FIG. 3 there are illustrated portions of three individual pixels 55 positioned in side-by-side relationship, each pair of adjacent pixels separated by a generally rectangular channel 66 formed in laminar assembly 54. Each of the channels 66 between adjacent pixels 55 defines the facing lateral edge surfaces 38 of adjacent pixels, and the edge surface 56 of each pixel has a convex contour viewed from the body portion 86 of the pixel. The edge surface 56 of each pixel, which is the light-emitting face, is shaped to a convex contour by controlling the movement of the second laser source and the second focusing station 76 illustrated in FIG. 2 relative to the movement of structure 50 to ablate the first and second electrically conductive layers 12, 22, first and second dielectric layers 16, 18 and the phosphor layer 20 of each pixel at the area 82 inward of the edge surface 56 of each pixel between a pair of adjacent channels 66. Stated in another manner, the edge surface 56 of TFEL edge emitter structure 50 is a generally planar surface prior to the formation of the plurality of channels 66 in the structure, and the formation of a pair of channels defines a pixel between the pair of channels having a generally planar edge surface 56. The second laser beam focused to a "point" of light energy ablates the various layers beginning at the planar edge surface 56 and extending inward into the body portion 86 of the pixel.

This ablation process removes the planar edge surface 56 of the pixel and forms a new edge surface or light-emitting face 56 having a convex contour. It should be understood that only the new edge surface 56 of each pixel 65 is illustrated in FIG. 3.

Now referring to FIG. 4, there are illustrated three individual pixels 55 positioned in side-by-side relationship, each pair of adjacent pixels separated by a generally rectangular channel 66. Each of the pixels 55 has a new edge surface 56 shaped to a concave contour viewed from the body portion 86 of the pixel. The concave edge surface or light-emitting face 56 of each pixel is formed in a manner similar to the manner in which the convex edge surface of each pixel in FIG. 3 is formed; that is, by controlling the movement of the second laser source and second focusing station 76 illustrated in FIG. 2 in a selected direction substantially perpendicular to the direction of movement of structure 50 as the second laser beam focused to a "point" of light energy ablates the various layers beginning at the planar edge surface defined as the channels are formed and extending inwardly into the body portion of the pixel.

Now referring to FIG. 5, there are illustrated three pixels 55 positioned in side-by-side relationship, each pair of adjacent pixels separated by a generally rectangular channel 66. As seen in FIG. 5, the new edge surface or light-emitting face 56 of each pixel is shaped to a convex contour viewed from the body portion 86 of the pixel. The new edge surface of each pixel is positioned relative to the new edge surface of the other two pixels to provide that the light generated by the trio of pixels is projected into overlapping relationship at a plane spaced a preselected distance from the new edge surfaces of the pixels. Thus, it is seen that by dividing the array of pixels formed in TFEL edge emitter structure 50 into groups of three pixels positioned side by side, and by shaping the edge surfaces of the trio of pixels each to the proper convex contour, the light projected by the trio of pixels forms an effective light source located at a plane spaced from the pixels.

Although the present invention has been described in terms of what are at present believed to be its preferred embodiments, it will be apparent to those skilled in the art that various changes may be made without departing from the scope of the invention. It is therefore intended that the appended claims cover such changes.

We claim:

1. A method for defining an array of pixels in a thin film electroluminescent edge emitter structure comprising the steps of:

providing a thin film electroluminescent edge emitter structure having a pair of electrically conductive outer layers with a plurality of inner layers interposed therebetween, one of said inner layers formed from a phosphor material;

moving said structure and a first high energy source relative to each other as said first high energy source is operated to project, in serial fashion, a plurality of first high energy pulses, said plurality of first high energy pulses striking one of said outer layers at a plurality of spaced apart locations in succession;

ablating said one outer layer and a predetermined number of inner layers of said structure at said plurality of locations with said plurality of first high energy pulses to form, in succession, a plurality of spaced apart channels in said structure, the portions of said structure remaining between each pair of adjacent channels defining a plurality of pixels each having a pair of lateral edge surfaces and an end portion having an edge surface terminating at an edge surface of said structure;

moving said structure with said plurality of pixels formed therein and a second high energy source relative to each other as said second high energy source is operated to project a second high energy beam, said second high energy beam striking each said pixel end portion at an area inward of each said pixel edge surface and ablating said one outer layer and said predetermined number of inner layers at said end portion; and controlling the movement of said structure and at least said second high energy beam relative to each other to correspondingly control the amount of material ablated from said one outer layer and said predetermined number of inner layers at said area inward of each said pixel edge surface to remove said pixel edge surface and form a new pixel edge surface shaped to a preselected contour.

2. The method of claim 1, which includes:

forming said thin film electroluminescent edge emitter structure from a first electrically conductive layer disposed on a substrate, a first dielectric layer disposed of said first electrically conductive layer, a second dielectric layer spaced from said first dielectric layer, a phosphor layer interposed between said first and second dielectric layers and a second electrically conductive layer disposed on said second dielectric layer, said second electrically conductive layer corresponding to said one outer layer;

ablating at least said second electrically conductive layer, second dielectric layer and phosphor layer at each of said preselected locations with one of said first high energy pulses to form a channel in said structure; and ablating at least said second electrically conductive layer, second dielectric layer and phosphor layer of each said pixel at said area inward of said pixel edge surface with said second high energy beam.

3. The method of claim 1, which includes:

maintaining said first high energy source in a stationary position during linear movement of said structure in proximity thereto as said plurality of first high energy beams are projected to form said plurality of spaced apart channels in said structure; and moving at least said second high energy beam in a selected direction substantially perpendicular to the direction of linear movement, of said structure at said area inward of each said pixel edge surface to remove said area and form said new pixel edge surface shaped to a preselected contour.

4. The method of claim 1, which includes:

focusing each said first high energy pulse to a line of light energy at said one outer layer of said structure to form a generally rectangular channel; and focusing said second high energy beam to a point of light energy at said one outer layer of said structure.

5. The method of claim 1, which includes:

positioning said first and second high energy sources substantially perpendicular with said one outer layer of said structure.

6. The method of claim 1, which includes:

moving said structure at a relatively constant linear speed.

7. The method of claim 1, which includes:

forming said plurality of spaced apart channels in said structure so that said channels are substantially parallel with each other.

8. The method of claim 1, which includes:

shaping each said new pixel edge surface to a concave contour.

9. The method of claim 1, which includes:

shaping each said new pixel edge surface to a convex contour.

10. The method of claim 1, which includes:

focusing each said first high energy pulse so that each said first high energy pulse has a preselected cross-sectional shape at said one outer layer of said structure; and ablating said one outer layer and said predetermined number of inner layers at said plurality of locations with said plurality of first high energy pulses focused to said preselected cross-sectional shape to form a plurality of spaced apart channels in said structure each having said preselected cross-sectional shape.

11. A method for defining an array of pixels in a thin film electroluminescent edge emitter structure comprising the steps of:

providing a thin film electroluminescent edge emitter structure formed from a first electrically conductive layer disposed on a substrate, a first dielectric layer disposed on said first electrically conductive layer, a second dielectric layer spaced from said first dielectric layer, a phosphor layer interposed between said first and second dielectric layers and a second electrically conductive layer disposed on said second dielectric layer;

moving said structure in proximity to a stationary first laser source with said second electrically conductive layer adjacent to said first laser source;

operating said first laser source to generate a plurality of first laser pulses, said plurality of first laser pulses striking said second electrically conductive layer at a plurality of spaced apart locations in succession to ablate a predetermined number of layers of said structure to form a plurality of channels in said structure, the portions of said structure remaining between each pair of adjacent channels defining an array of adjacent pixels each having a pair of lateral edge surfaces and an end portion having an edge surface terminating at an edge surface of said structure;

moving said structure having said pixels formed therein in proximity to a second laser source, said second laser source being operable to project a second laser beam, at least said second laser beam being movable in a direction substantially perpendicular to the direction of movement of said structure;

striking said end portion of each said pixel with a second laser beam provided from said second laser source at an area inward of said edge surface to ablate said predetermined number of layers at said end portion; and controlling the movement of at least said second laser beam relative to said movement of said structure to correspondingly control the amount of material ablated from said predetermined number of layers at said area inward of said pixel edge surface to remove said pixel edge surface and form a new pixel edge surface shaped to a preselected contour.

12. The method of claim 11, which includes:

positioning a first focusing assembly between said first laser source and said structure, said first focusing assembly being operable to focus each said first laser pulse to a line of light energy at said second electrically conductive layer; and positioning a second focusing assembly between said second laser source and said structure, said second focusing system being movable with said second laser source and operable to focus said second laser beam to a point of light energy.

13. The method of claim 11, which includes:

extending said channel formed at each said location through at least said second electrically conductive layer, said second dielectric layer and said phosphor layer; and ablating at least said second electrically conductive layer, said second dielectric layer and said phosphor layer at said area inward of each said pixel end portion.

14. The method of claim 11, which includes:

moving said structure in proximity to said first laser source at a substantially constant linear speed.

15. The method of claim 11, which includes:

forming said channels in said structure so that said channels extend a preselected distance into a central portion of said structure from said structure edge surface.

16. The method of claim 11, which includes:

moving said structure in proximity to said first laser source at a constant linear speed; and pulsing said first laser source at preselected time intervals to control the spacing between adjacent channels formed in said structure.

17. The method of claim 11, which includes:

shaping each said new pixel edge surface to a concave contour.

18. The method of claim 11, which includes:

shaping each said new pixel edge surface to a convex contour.

19. The method of claim 10, which includes:

forming said plurality of spaced apart channels in said structure so that said channels are substantially parallel with each other.

20. The method of claim 11, which includes:

focusing each said first high energy pulse so that each said first high energy pulse has a preselected cross-sectional shape at said second electrically conductive layer; and ablating said predetermined number of layers at said plurality of locations with said plurality of first high energy pulses focused to a preselected cross-sectional shape to form a plurality of spaced apart channels in said structure each having said preselected cross-sectional shape.

* * * * *